UNITED STATES PATENT OFFICE.

GEORGE M. FORMBY, OF JACKSONVILLE, FLORIDA, ASSIGNOR TO FORMBY PETRINITE CORPORATION, OF JACKSONVILLE, FLORIDA, A CORPORATION OF DELAWARE.

PROCESS OF MAKING A CEMENTITIOUS COMPOSITION.

1,379,680.     Specification of Letters Patent.     Patented May 31, 1921.

No Drawing.     Application filed March 10, 1920. Serial No. 364,736.

*To all whom it may concern:*

Be it known that I, GEORGE M. FORMBY, a citizen of the United States, residing at Jacksonville, in the county of Duval and State of Florida, have invented certain new and useful Improvements in Processes of Making a Cementitious Composition; and I do hereby declare the following to be a full, clear, and exact description of the invention, such as will enable others skilled in the art to which it appertains to make and use the same.

This invention relates to cementitious compounds and processes of making the same and has for its object to provide a composition of matter, and a method of producing it, which will be more efficient in action and less costly to employ than those heretofore proposed.

With these and other objects in view, the invention consists in the novel composition of matter, and in the novel steps and combinations of steps constituting the process, all as will be more fully hereinafter disclosed and particularly pointed out in the claims.

In carrying out this invention I may take for example, proportions of:

Calcium oxid, CaO, not less than __ 70 lbs.
Magnesium oxid, MgO, not over ____ 2 lbs.
Calcium carbonate, $CaCO_3$, about __ 2 lbs.
Calcium hydroxid, $Ca(OH)_2$, about_ 20 lbs.
Magnesium hydroxid, $Mg(OH)_2$, about _____ 6 lbs.

These compounds are thoroughly mixed in the dry state, and I then add sufficient water to form a creamy paste, and heat slowly until the water disappears. The mass is now allowed to cool, and is kept from contact with the air until ready for use, but preferably, it is reduced to a dry powder before storing it away. When it is to be used I finely divide said mass if it is not already in a powdered state, and I stir it slowly into hydrochloric acid, HCl, say of a strength of from 18°–36° Bé., and until all of said acid is used up. This point will be reached when the mass ceases to give off bubbles and changes from a yellowish to a dark ashy color. At the same time the previously evolved stifling fumes will have ceased.

With one hundred pounds of material as above set forth I would use about two hundred and fifty pounds of hydrochloric acid having a strength of 18° Bé. This mass at first may be said to have about the consistency of thick buttermilk, but after say twenty-four hours settling it separates into a mudlike substance at the bottom, and a supernatant fluid having about the consistency of a lubricating oil, and which will pour about as readily.

This said fluid when it is to be used is mixed in the proportions of from one part fluid to four parts of water, to from one part fluid to twenty parts water, and if added to hydraulic cements, such for example, as Portland cement it will greatly harden and strengthen the same, and of course it will have a similar advantageous effect in all compositions in which such cements form a material constituent. Said fluid will also be found useful in the making of artificial stones, as it binds their constituents together; and when old disintegrating oyster shells form a part of said stones, this fluid produces a most beautiful product which may be polished into a surface having pearly patches therein. Said fluid is also capable of being put to a large number of other uses not necessary to mention. I do not know its chemical composition at present.

Instead of using the fluid alone in the manner above mentioned, it may be stirred up with said mudlike substance and used as described. Either said fluid or mudlike substance, or both mixed, may be heated to evaporate the water present until the mass assumes say the consistency of a syrup. Said mass may then be poured immediately into containers and allowed to cool, whereupon it will form a solid stone like substance in which condition it may be shipped or stored, or kept indefinitely. When said stored mass is to be used, it is only necessary to add water in the proportions of from three to fifteen pounds of the said mass to one hundred pounds of water. Or said mass may be only finely subdivided and added directly to cements, etc., without previously dissolving it in water. In the latter case the water added to the cement will dissolve it.

It is desirable to have as little magnesium oxid in the mixture as possible, and although a quantity over two per cent. might be used, yet it is desirable to keep the quantity of oxid down below two per cent., for otherwise experience has shown that the advantageous properties of the composition are decreased. As regards the calcium carbonate the limits are more variable. As much as say five per cent. or over could be used but it is desirable to keep it around about two to four per cent. As regards the magnesium hydroxid it is not necessary unless the magnesium oxid is present, but if there is say two per cent. magnesium oxid present, one should have about six per cent. of magnesium hydroxid to go with the oxid. The calcium hydroxid should be close around twenty per cent. to go with the seventy per cent. calcium oxid. It has been found from experience that the best results are attained when the calcium oxid or the calcium hydrate that is employed has not been stored in contact with the air for any appreciable time. In other words, the fresh oxid or fresh hydrate gives decidedly better results than are attainable when these compounds have been long in contact with the air.

It is obvious that those skilled in the art may vary the details of the composition as well as of the procedure, without departing from the spirit of the invention, and therefore I do not wish to be limited to the above disclosure except as may be required by the claims.

What I claim is:—

1. The process of producing a cementitious product which consists in providing a mixture of calcium magnesium hydrates; and reacting on said mixture with hydrochloric acid and adding the resulting product to a cementitious composition, substantially as described.

2. The process of producing a cementitious product which consists in providing a mixture of calcium oxid with calcium and magnesium hydrates; reacting on said mixture with hydrochloric acid to produce a fluid mass; and adding said mass to a self-hardening cementitious composition, substantially as described.

3. The process of producing a cementitious product which consists in providing a mixture of calcium and magnesium oxids with calcium and magnesium hydrates; reacting on said mixture with hydrochloric acid and adding the mass thus produced to a hydraulic cement, substantially as described.

4. The process of producing a cementitious product which consists in providing a mixture of calcium carbonate with calcium and magnesium hydrates; reacting on said mixture with hydrochloric acid and adding the product of the reaction to a self-hardening plastic composition, substantially as described.

In testimony whereof I affix my signature.

GEORGE M. FORMBY.